Feb. 2, 1954 E. W. CHAPIN ET AL 2,668,193
AUTOMATIC SWITCHING OF TELEVISION RECEIVERS
Filed Nov. 8, 1950
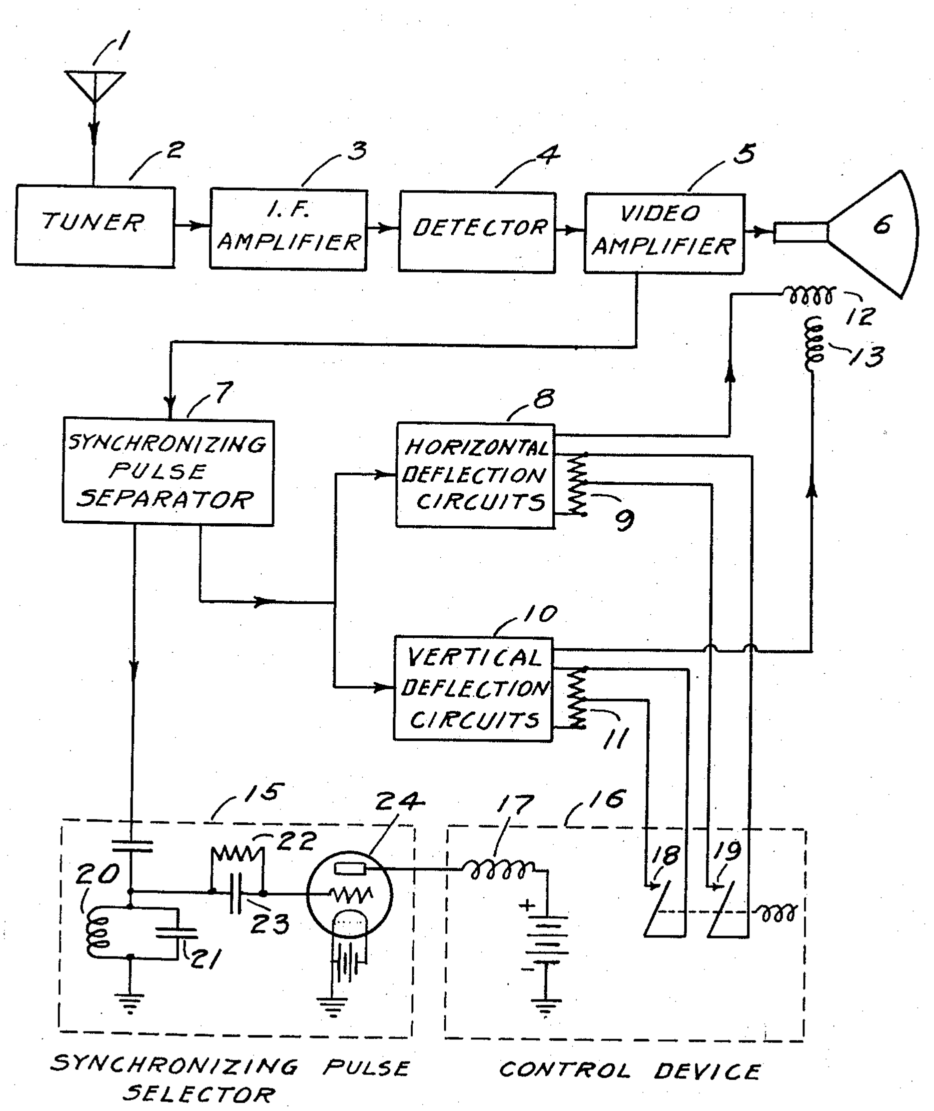
EDWARD W. CHAPIN and
WILMAR K. ROBERTS
INVENTORS
BY H. L. Godfrey
ATTORNEY Patented Feb. 2, 1954 2,668,193

UNITED STATES PATENT OFFICE 2,668,193

AUTOMATIC SWITCHING OF TELEVISION RECEIVERS

Edward W. Chapin, Baltimore, and Willmar K. Roberts, Laurel, Md.

Application November 8, 1950, Serial No. 194,698

6 Claims. (Cl. 178—69.5)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to improvements in television receivers, or other devices intended to display television pictures, and more specifically to a television receiver having automatic means to adjust its deflection frequencies to correspond to the synchronizing standards of the picture signal being received.

It has occurred that in one locality different television transmitting stations broadcast television signals with different standards as to frame and line frequencies. This may result from simultaneous operation with two systems. It may result when the standards are changed and some stations are left on the old standards for an interim period to avoid making a great number of receivers immediately obsolete and useless. It may occur when colored pictures are transmitted on one set of standards while black and white pictures are transmitted on other standards. It may also occur when the television receiver is located near international boundaries where it may be able to receive television signals employing two or more systems of synchronizing standards.

The conventional television receiver will only receive a picture transmitting almost the exact line and frame frequencies for use for which the receiver was intended. Fine adjustments of the deflection frequencies are usually provided to allow an exact adjustment of the receiver deflection circuits to the frequency of the transmitted signal. Such fine adjustments are intended to remain fixed when once the adjustment is made and they will not serve to adapt the receiver to another standard of line and frame frequencies. A coarse adjustment of the deflection frequencies could be provided to adjust the deflection circuits to the various standards of the signals to be received but this would not only mean additional dials to be manipulated as the station selector dial is changed from station to station but would also prevent a picture from being displayed whenever the coarse deflection dials did not correspond in setting to the station being received.

It is an object of this invention to provide a television receiver which will, with a minimum of manual adjustment, receive and display pictures transmitted under a plurality of different standards, differing as to line and frame frequencies, or other characteristics.

It is also an object of this invention to provide a television receiver having means to determine from the television signals received the line and frame frequencies or other distinguishing characteristic and to automatically adjust the horizontal and deflection circuits to operate at the proper frequencies.

Other objects and advantages will become apparent to those skilled in the art from the following specification, when taken in conjunction with the accompanying drawing wherein the single figure of the drawing shows a block diagram of a television receiver embodying the principles of this invention.

As seen in the drawing, this invention resides in an improvement in the conventional television receiver. The antenna 1 is connected to the tuner 2 which in turn is connected through the intermediate frequency amplifier 3, the detector 4, and the video amplifier 5 to the cathode ray display tube 6. The amplifier 5 also is connected to the synchronizing pulse separator 7, the output of which is connected to both the horizontal deflection circuits 8 and the vertical deflection circuit 10. The frequency of the deflection waves produced by horizontal deflection circuits 8 and the vertical deflection circuits 10 is determined by, among other circuit parameters, the resistors, 9 and 11. The deflection waves produced by deflection circuits 8 and 10 are fed respectively to horizontal and deflection coils 12 and 13.

The above enumerated components are conventional in television receivers and they operate in the conventional manner. The antenna 1 picks up a radio-frequency television signal which it passes to the tuner 2. The tuner 2 excludes the undesired television signals, and in a heterodyne stage transforms the radio-frequency television signal received into an intermediate frequency signal and feeds this latter signal to the intermediate frequency amplifier 3 where it is amplified. This amplified intermediate frequency signal is passed to the detector 4 where it is converted into a video frequency signal which is fed to the video amplifier for further amplification. The amplified video signal is then passed to the cathode ray tube 6 where it is converted into a visible picture.

The video signal from amplifier 5 is also applied to the synchronizing pulse separator 7 where the synchronizing pulses, both line and frame, are separated from the signals indicating picture content and the separated synchronizing pulses are applied to both the horizontal deflection circuits 8 and the vertical deflection circuits 10.

The horizontal deflection circuits 8, under the control of the applied line synchronizing pulses, produce a wave to cause the proper uniform deflection of the electron beam in the cathode ray tube 6 transversely across the screen at a uniform speed and back at a much higher rate.

Vertical deflection circuits 10, under the control of the field synchronizing pulses, produce and apply to the vertical deflection coil 13 a deflection wave capable of moving the cathode ray beam vertically across the screen at a uniform rate and back at a much higher rate.

The synchronizing pulse selector 15 and the control device 16 are the new components provided by this invention to automatically adjust the television receiver to receive television signals transmitted on a plurality of standards with no more manipulation than a selection by the tuner 2 of the station to be received.

It is assumed as an example of the application of this invention that the television receiver comprising components 1 through 13 is normally adjusted to receive a black and white picture having 525 lines and 60 fields odd-line interlace. It is further assumed that proper alteration of resistors 9 and 11 adjust the television receiver to receive a 405-line, 144-field interlaced color system which will be received in this receiver in black and white. The black and white signals include the transmission of 15,750 line synchronizing pulses and 60 field synchronizing pulses per second, whereas the color picture synchronizing standards include the transmission of 29,160 line synchronizing pulses and 144 field synchronizing pulses per second. Thus the two systems differ in the number of horizontal and vertical synchronizing pulses which are transmitted per second in addition to the other details which will not be mentioned here.

The synchronizing pulse selector 15 is a frequency selecting device which may depend on mechanical or electrical resonance or any other frequency selective effect so arranged as to respond to the repetition rate of the synchronizing signals of one or two, or more, television systems or synchronizing standards to which the receiver might be tuned. One circuit suitable for use as the synchronizing pulse selector 15 is shown in the drawing. In this illustrated circuit a resonant circuit is provided comprising inductance 20 and capacitance 21. One end of the resonant circuit 20—21 is connected through a coupling condenser to the output of the synchronizing pulse separator 7 and is also connected through grid resistor 22 and grid condenser 23 to the grid of vacuum tube 24. The other end of resonant circuit 20—21 is connected to ground as is the cathode of tube 24. A connection to the plate of tube 24 forms the output of component 15. The plate voltage supply of tube 24 is conventional and is not shown in the drawing.

The control means 16 shown in the drawing consists of a relay connected to the plate of tube 24. Relay contacts 18 and 19 are arranged to shunt out, on operation of the relay, a portion of the resistors 9 and 11 of deflection circuits 8 and 10.

In the example assumed here the synchronizing pulse selector 15 would, as a result of the frequency-selective characteristic of the resonant circuit 20—21, respond to the 29,160-cycle-per-second line synchronizing pulses of the color system but not the 15,750-cycle-per-second line synchronizing pulses of the black-and-white picture.

When the television receiver is tuned to a station transmitting a monochrome picture with 15,750 line synchronizing pulses per second the tuned circuit 20—21 prevents the development of a large voltage. The average plate current of tube 24 is unaffected and control circuit 16 is not operated.

When the television receiver is tuned to a station transmitting pictures in color, the 29,160-cycle-per-second line synchronizing pulses of the color signal are applied to said resonant circuit and a large voltage at 29,160-cycles-per-second is applied to the control grid of tube 24, which through the operation of grid resistor 22 and grid condenser 23 causes a variation of the average plate current of tube 24. This variation in the average plate current of tube 24 operates the relay in component 16, and shunts out a predetermined portion of resistors 9 and 11 of deflection circuits 8 and 10 to change the rates of these circuits in accordance with the deflection rates required by the standards of the system being received.

It is obvious that the control device 16 could comprise an electronic circuit rather than the mechanical relay shown and that the control means 16 could be used to alter capacitance or inductance as well as resistance, as is required to change the rates from one standard to another. It is also obvious that if the television receiver is to be automatically adjusted for receiving more than two standards of television signals, that more resonant means, such as 15, would be provided, the outputs of which are applied to corresponding control means, such as 16, arranged to properly adjust the deflection circuits 8 and 10. It is further obvious that control means 16 may be furnished with additional contacts or other means to alter picture size, brightness, focus, geometrical linearity, or to start or stop the rotation of a color filter for portrayal of colored pictures.

While in the example given above the synchronizing puse separator 15 was described as responsive to the line synchronizing pulse frequency of the color system, it is to be understood that the component 15 could also be responsive to the 144-cycle-per-second field synchronizing pulses of the color system or to any other recurring characteristic of the color television signal.

There is disclosed above a novel means by which a television receiver or other television display means may be automatically adapted to operate properly on two or more systems of synchronizing standards which may differ in the number of lines per second, number of fields per second, or other differences, without any human intervention in the form of manual switching or control.

The system of television synchronizing standards is herein defined as that set of signals which are transmitted along with television picture information, which set of signals are employed at the receiver to cause the received television picture information to be displayed in proper order and sequence in order to reproduce the transmitted picture. These signals may include line synchronizing pulses, frame synchronizing pulses, and color field synchronizing pulses, but are not necessarily limited to those specifically mentioned here. Two or more different systems of television synchronizing standards may differ in the number of the various signals transmitted per second, or they may differ in the presence or absence of one or more of such signals, or they may differ in the particular shapes or types of signals.

It will be understood that the modification and description given above is exemplary only and that many modifications and changes will occur to those skilled in the art within the scope of the invention as defined by the appended claims.

What is claimed is:

1. A television receiver having, a selector device resonant to a television synchronizing signal occurring at a predetermined frequency and passing only said predetermined frequency, a control device connected to the output of said resonant selector device, said control device being operated by said predetermined frequency when passed by said resonant selector device, horizontal and vertical deflection circuits each having a plurality of alternately selectable adjustments producing different predetermined frequencies and each being connected to said control device and connected to produce one of at least two predetermined deflection frequencies in response to said control device, and a connection for applying said synchronizing pulses to both deflection circuits for synchronizing those circuits.

2. A television receiver including horizontal and vertical deflection circuits, a synchronizing pulse separator, a synchronizing pulse selector and a control device, said horizontal and vertical deflection circuits each being preset to two alternately selectable frequency adjustments, said control device being connected to each of said deflection circuits and arranged to selectively adjust both deflection circuits to either of their preset frequency adjustments, said synchronizing pulse separator being connected to said synchronizing pulse selector, said synchronizing pulse selector being connected to said control device, said synchronizing pulse selector being responsive to at least one frequency to operate said control device and adjust said deflection circuits from one preset frequency adjustment to another, and a connection between the synchronizing pulse separator and both deflection circuits for synchronizing those deflection circuits.

3. A television receiver including a vertical deflection circuit and a horizontal deflection circuit, each of said deflection circuits having at least two preset alternately selectable frequency adjustments, each frequency adjustment corresponding to the deflection rate required by one television transmission standard, control means connected to each of said deflection circuits and arranged to selectively adjust both deflection circuits to either of their preset adjustments, a synchronizing pulse selector to which is applied the synchronizing pulses received by said receiver, said synchronizing pulse selector being connected to said control means and being responsive to some characteristic of said synchronizing signal to operate the control means to adjust the deflection circuits to rates corresponding to the received synchronizing signal, and a connection for applying said synchronizing pulses to both deflection circuits for synchronizing those circuits.

4. A television receiver including a synchronizing pulse separator, a horizontal deflection circuit, a vertical deflection circuit, a resonant selector device, and a control device, said synchronizing pulse separator being connected to apply synchronizing pulses to said horizontal deflection circuit, said vertical deflection circuit, and said resonant selector device, said resonant selector device being adapted to pass only a recurring characteristic of television signals transmitted under one standard and being connected to said control device, each of said deflection circuits being arranged to produce any one of a plurality of frequencies, said control device being connected to said horizontal and vertical deflection circuits to adjust said horizontal and vertical deflection circuits to the proper frequencies corresponding to the received synchronizing pulses, and a connection between said synchronizing pulse separator and each of said deflection circuits for synchronizing those deflection circuits.

5. A television receiver including a synchronizing signal separator, a vertical scanning wave generating means, and a horizontal scanning wave generating means, both of said scanning wave generating means being connected to alternately and selectively produce scanning waves of at least two frequencies, each of said scanning wave generating means being connected to a switch means for determining the frequency produced by said last mentioned scanning wave generating means, a control means operating said switch means to select which of said two frequencies said scanning wave generating means produce, filter means connected to said synchronizing signal separator and to said control means for passing to said control means only a recurring characteristic of television synchronizing signals transmitted under one standard of transmission, means connecting said synchronizing signal separator to said scanning wave generating means to properly synchronize said scanning wave generating means.

6. A television receiver including a vertical deflection circuit and a horizontal deflection circuit, at least one of said deflection circuits having a plurality of pre-set alternately selectable frequency adjustments, each frequency adjustment corresponding to the deflection rate required by one television transmission standard, control means connected to said one of said deflection circuits having said frequency adjustments and arranged to selectively adjust said one deflection circuit to either of its pre-set adjustments, a synchronizing pulse selector to which is applied the synchronizing pulses received by said receiver, said synchronizing pulse selector being connected to said control means and being responsive to some characteristic of said synchronizing signal to operate the control means to adjust said one deflection circuit to a rate corresponding to the received synchronizing signal, and a connection for applying said synchronizing pulses to both deflection circuits for synchronizing those circuits.

EDWARD W. CHAPIN.
WILLMAR K. ROBERTS.

References Cited in the file of this patent

UNITED STATES PATENTS

| Number | Name | Date |
|---|---|---|
| 1,978,684 | McCreary | Oct. 30, 1934 |
| 2,369,783 | Homrighous | Feb. 20, 1945 |
| 2,398,641 | Homrighous | Mar. 16, 1946 |
| 2,468,256 | Espley | Mar. 26, 1949 |
| 2,524,349 | Homrighous | Oct. 3, 1950 |